(12) United States Patent
Moritomo (10) Patent No.: US 12,254,075 B2
(45) Date of Patent: Mar. 18, 2025

(54) ELECTRONIC DEVICE AND CONTROL METHOD

(71) Applicant: CANON KABUSHIKI KAISHA, Tokyo (JP)

(72) Inventor: Hiroshi Moritomo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 17/517,124

(22) Filed: Nov. 2, 2021

(65) Prior Publication Data
US 2022/0138308 A1    May 5, 2022

(30) Foreign Application Priority Data
Nov. 4, 2020 (JP) .................. 2020-184643

(51) Int. Cl.
| | |
|---|---|
| G06F 21/44 | (2013.01) |
| G06F 1/26 | (2006.01) |
| G06F 1/3234 | (2019.01) |
| G06F 21/81 | (2013.01) |
| H02J 7/00 | (2006.01) |

(52) U.S. Cl.
CPC .............. *G06F 21/44* (2013.01); *G06F 1/266* (2013.01); *G06F 1/3234* (2013.01)

(58) Field of Classification Search
CPC .......... G06F 21/44; G06F 1/266; G06F 1/234
See application file for complete search history.

(56) References Cited

U.S. PATENT DOCUMENTS

| | | | | |
|---|---|---|---|---|
| 2007/0132733 | A1* | 6/2007 | Ram | G06F 3/03544 345/163 |
| 2010/0306561 | A1* | 12/2010 | Sathath | G06F 1/266 713/320 |
| 2014/0189892 | A1* | 7/2014 | Nair | G06F 21/81 726/36 |
| 2017/0293335 | A1* | 10/2017 | Dunstan | G06F 13/4022 |
| 2018/0026404 | A1* | 1/2018 | Geo | H01R 13/66 439/620.21 |
| 2018/0166886 | A1 | 6/2018 | Ueda | |
| 2019/0212795 | A1* | 7/2019 | Moritomo | G06F 1/26 |
| 2019/0280510 | A1* | 9/2019 | Sato | H02J 7/00 |

FOREIGN PATENT DOCUMENTS

| | | |
|---|---|---|
| CN | 106445860 A | 2/2017 |
| CN | 110661968 A | 1/2020 |
| JP | 2018-097643 A | 6/2018 |

* cited by examiner

*Primary Examiner* — Jaweed A Abbaszadeh
*Assistant Examiner* — Gayathri Sampath
(74) *Attorney, Agent, or Firm* — Canon U.S.A., Inc. IP Division (57) ABSTRACT

An electronic device includes an authentication unit and a control unit. The authentication unit performs an authentication communication with an external device for determining whether or not the external device is a predetermined device. The control unit requests a second power that is greater than a first power from the external device, in a case where the external device is determined to be the predetermined device and the external device is determined to be a no-additional-cable-required type of power supply device.

11 Claims, 9 Drawing Sheets

| TLV Type | Length | Data |
|---|---|---|
| FEh<br>(Vendor_Extension) | 04h<br>(Data_Length) | 04A9 0001h<br>(VID/CaptiveCable) |

FIG. 9

ELECTRONIC DEVICE AND CONTROL METHOD

BACKGROUND

Field of the Disclosure

Aspects of the disclosure generally relate to an electronic device, and a method of controlling the electronic device.

Description of the Related Art

USB (Universal Serial Bus) Type-C and USB PD (Power Delivery) standards are known as standards related to USBs. USB interfaces conforming to the USB PD standard can supply up to 100 W of power.

Japanese Patent Laid-Open No. 2018-097643 describes a power supply device that performs authentication communication with each of a power receiving device and a USB cable.

Hereinafter, a power supply device having an integrated USB cable and a power supply device having a connector capable of connecting with a power receiving device without using a USB cable are collectively referred to as a no-additional-cable-required type of power supply device.

It is assumed that a no-additional-cable-required type of power supply device can correctly respond to authentication communication directed to the power supply device but cannot correctly respond to authentication communication directed to a USB cable. If the no-additional-cable-required type of power supply device is connected to a power receiving device described in Japanese Patent Laid-Open No. 2018-097643 and if the no-additional-cable-required type of power supply device fails authentication communication directed to a USB cable, for example, in many cases, power supply from the no-additional-cable-required type of power supply device to the power receiving device will be restricted.

SUMMARY

According to various embodiments, even if a power supply device is a no-additional-cable-required type of power supply device, power supply from the power supply device to a power receiving device to which it is connected will be appropriately controlled.

According to various embodiments, there is provided an electronic device that includes: an authentication unit that performs an authentication communication with an external device for determining whether or not the external device is a predetermined device; and a control unit that requests a second power that is greater than a first power from the external device, in a case where the external device is determined to be the predetermined device and the external device is determined to be a no-additional-cable-required type of power supply device.

According to various embodiments, there is provided a method that includes: performing an authentication communication with an external device for determining whether or not the external device is a predetermined device; and in a case where the external device is determined to be the predetermined device and the external device is determined to be a no-additional-cable-required type of power supply device, requesting a second power that is greater than a first power from the external device.

Further aspects of the disclosure will become apparent from the following description of example embodiments.

DESCRIPTION OF THE EMBODIMENTS

Example embodiments, features, and aspects of the disclosure will be described below with reference to the drawings. However, embodiments of the invention are not limited to the following example embodiments.

Figure 1:
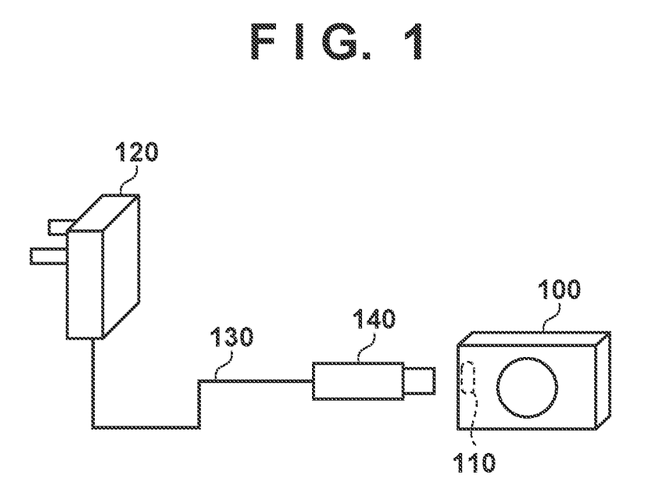
FIG. 1 is a diagram for illustrating an example of a configuration of a power supply system according to various embodiments.

[First Embodiment] FIG. 1 is a diagram for illustrating an example of a configuration of a power supply system according to various embodiments.

As illustrated in FIG. 1, a power supply system in first to third embodiments described herein includes a power supply device 120 and a power receiving device 100 capable of operating with power supplied from the power supply device 120. Both the power supply device 120 and the power receiving device 100 are electronic devices that conform to USB (Universal Serial Bus) PD (Power Delivery) standard and USB Type-C standard.

The power receiving device 100 is an electronic device capable of acting as, for example, a digital camera, a digital video camera, a personal computer, a tablet computer, a media player, a PDA, a cellular phone, a smartphone, a game console, a robot, or a drone.

The power supply device 120 is an electronic device capable of acting as, for example, a USB-AC adaptor, a mobile battery, a personal computer, or a tablet computer. The power supply device 120 is a no-additional-cable-required type of power supply device. Here, it is assumed that the power supply device 120 has an integrated cable 130 that is integrated with the power supply device 120. An end of the integrated cable 130 is provided with a plug 140. The plug 140 engages with a receptacle 110 provided in the power receiving device 100.

Note that a no-additional-cable-required type of power supply device may be a power supply device having the integrated cable 130 or a power supply device having a connector capable of connecting with a power receiving device without using a USB cable. Accordingly, although the power supply device 120 having the integrated cable 130 will be described in this specification, the device may be the power supply device 120 provided with the plug 140 in the housing in other embodiments.

Figure 2:
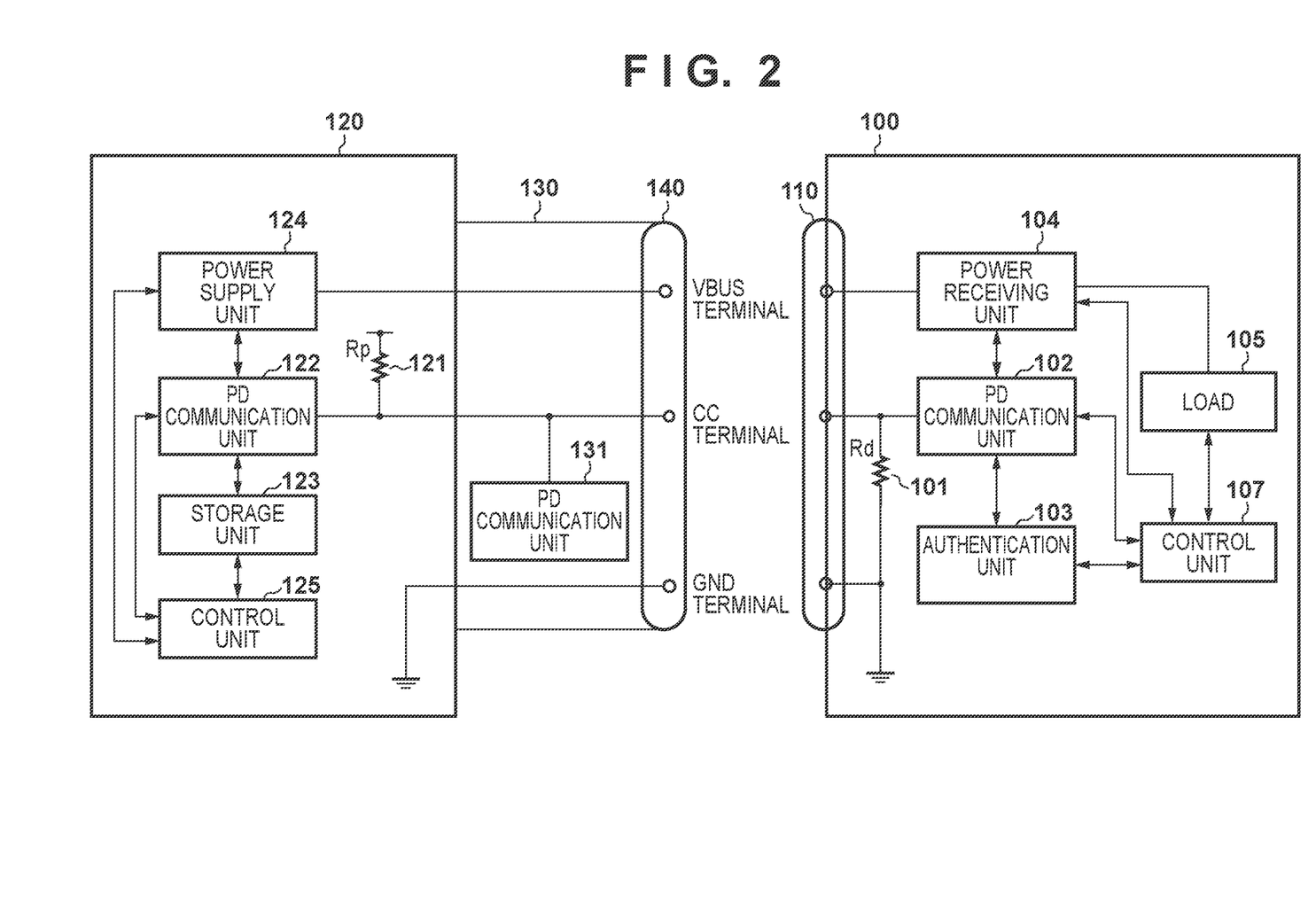
FIG. 2 is a block diagram for illustrating an example of a configuration of a power receiving device 100 and a power supply device 120 according to a first embodiment.

FIG. 2 is a block diagram for illustrating an example of a configuration of the power supply system illustrated in FIG. 1. In FIG. 2, components that are the same as in FIG. 1 are denoted by the same reference numerals.

Power from the power supply device 120, which is an external device, is supplied to a VBUS terminal of the receptacle 110. A CC (Configuration Channel) terminal of the receptacle 110 is used for communication (PD communication) conforming to the USB PD standard. A GND terminal of the receptacle 110 is connected to a ground potential (GND) of the power receiving device 100.

A pull-down resistor 101 connects the CC terminal of the receptacle 110 and the GND of the power receiving device 100. The pull-down resistor 101 is used for the power supply device 120 to detect the connection of the power receiving device 100 and for the power receiving device 100 to determine the power supply capability of the power supply device 120 based on voltage. According to the USB Type-C standard, a device with a pull-down resistor connected to the CC terminal is identified as a power receiving device (sink), and a device with a pull-up resistor connected to the CC terminal is identified as a power supply device (source).

A PD communication unit 102 is connected to the CC terminal of the receptacle 110 and performs PD communication with the power supply device 120 through the CC terminal. The PD communication unit 102 determines whether or not the power supply device 120 is a device capable of PD communication.

If it is determined that the power supply device 120 is a device capable of PD communication, the power receiving device 100 performs negotiation communication with the power supply device 120 through the PD communication unit 102. The power receiving device 100 requests the power supply device 120 to supply desired power through negotiation communication. Furthermore, the power receiving device 100 performs authentication communication according to a USB Type-C Authentication standard (hereinafter, referred to as a USB AUTH standard) with at least the power supply device 120 among the power supply device 120 and the cable 130 through the PD communication unit 102. Authentication communication is performed to determine whether or not the partner device is a predetermined device (i.e., a device conforming to the USB PD standard). According to the first embodiment, the power receiving device 100 operates as an authentication initiator according to the USB AUTH standard.

According to the first embodiment, the PD communication unit 102 has at least two types of options for power to be requested from the power supply device 120. One option may be the minimum power at which the power receiving device 100 can perform operations until the result of the authentication communication is obtained.

An authentication unit 103 authenticates whether or not the power supply device 120 is a predetermined device (i.e., a device conforming to the USB PD standard). For example, the authentication unit 103 performs authentication communication conforming to the USB Type-C Authentication standard (the USB AUTH standard) with each of the power supply device 120 and the cable 130 via the PD communication unit 102. The authentication unit 103 determines whether each of the power supply device 120 and the cable 130 is a predetermined device (i.e., a device conforming to the USB PD standard) based on predetermined information acquired by authentication communication. The authentication unit 103 notifies a control unit 107 of the determination result (authentication result).

A power receiving unit 104 is connected to the VBUS terminal of the receptacle 110 and supplies power supplied from the power supply device 120 via the VBUS terminal to the components of the power receiving device 100. The power receiving unit 104 further performs control based on the information obtained from the PD communication unit 102 so that the power supplied from the power supply device 120 does not exceed a predetermined value.

A load 105 includes a circuit and the like that operate by consuming power supplied from the power receiving unit 104. The configuration of the load 105 differs depending on what device the power receiving device 100 can operate as. The power consumption of the load 105 varies depending on what operation the power receiving device 100 is performing. For example, if the power receiving device 100 can operate as a digital camera, the load 105 includes a motor for driving a lens unit, an image sensor and its peripheral circuits, an image processing circuit, a display device, a storage device, a speaker, a touch panel, buttons, switches, and the like. For example, if the power receiving device 100 can operate as a digital camera, the power consumption of the load 105 differs depending on whether or not a live view image is on the display device, whether or not the lens unit is being driven, and the like.

The control unit 107 is configured to control each component of the power receiving device 100. The control unit 107 includes, for example, a hardware processor (such as a CPU) that controls each component of the power receiving device 100 and a memory that stores programs that the hardware processor can execute. The memory of the control unit 107 stores, for example, program for realizing processes performed in the power receiving device 100, which will be described later.

The power supply device 120 has a pull-up resistor 121 connected between a CC terminal of the plug 140 and a reference power supply. The pull-up resistor 121 is used for the power supply device 120 to determine the connection of the power receiving device 100 and for the power supply device 120 to present the power supply capability to the power receiving device 100. The reference power supply is, for example, a constant voltage source of 5V.

A PD communication unit 122 is connected to the CC terminal of the plug 140 and performs PD communication with the power receiving device 100 through the CC terminal. The PD communication unit 122 determines whether or not the power receiving device 100 is a device capable of PD communication.

If it is determined that the power receiving device 100 is a device capable of PD communication, the power supply device 120 performs negotiation communication with the power receiving device 100 through the PD communication unit 122. In the negotiation communication, the power supply device 120 transmits information on power that can be supplied to the power receiving device 100. Furthermore, the power supply device 120 is capable of authentication communication according to the USB AUTH standard through the PD communication unit 122. According to the first embodiment, the power supply device 120 operates as an authentication responder according to the USB AUTH standard.

A storage unit 123 stores information (such as certificate chains and XIDs) required for the power supply device 120 to function as an authentication responder specified in the USB AUTH standard. The storage unit 123 stores device information of the power supply device 120. The storage unit 123 may be, for example, a rewritable non-volatile memory. The device information includes, for example, information with which the power receiving device can determine that the power supply device 120 is a no-additional-cable-required type of power supply device. The information may be the model number (model name) of the power supply device, or may be a specific character string or a numerical value. Information necessary for power supply device to function as an authentication responder may be used as device information. Any description format of the information may be used as long as the power receiving device 100 can determine that the power supply device 120 is a no-additional-cable-required type of power supply device based on the information.

A power supply unit 124 is connected to a VBUS terminal of the plug 140 and supplies power to the power receiving device 100. The power supply unit 124 can supply power at a voltage and current conforming to the USB PD standard. The power supply unit 124 controls the power supplied to the power receiving device 100 based on PD communication with the power receiving device 100.

Next, a process performed in the power receiving device 100 will be described with reference to the flowchart of FIG. 3. This process is started, for example, if it is detected by the power receiving unit 104 that the power supply device 120 is connected to the receptacle 110 of the power receiving device 100. The power receiving unit 104 detects that the power supply device 120 is connected to the receptacle 110 if the voltage of the VBUS terminal exceeds a predetermined voltage level. The power receiving unit 104 notifies the control unit 107 that it has detected that the power supply device 120 is connected to the receptacle 110.

In step S301, the control unit 107 instructs the PD communication unit 102 to start communication conforming to the USB PD standard (PD communication).

In step S302, the PD communication unit 102 determines that the power supply device 120 is a device capable of PD communication when a predetermined message conforming to the USB PD standard is received from the power supply device 120 within a predetermined period of time. Furthermore, the PD communication unit 102 determines that the power supply device 120 is a device that can operate as a source device according to the USB PD standard. The predetermined message is, for example, a message (Source_Capabilities) including information indicating power that can be supplied by the power supply device 120.

On the other hand the PD communication unit 102 determines that the power supply device 120 is not a device capable of PD communication if the predetermined message conforming to the USB PD standard is not received from the power supply device 120 within the predetermined amount of time. The PD communication unit 102 notifies the control unit 107 that it has determined that the power supply device 120 is not a device capable of PD communication. The control unit 107 performs the process of step S303 if it is determined that the power supply device 120 is a device capable of communication conforming to the USB PD standard. The control unit 107 performs the process of step S312 if it is determined that the power supply device 120 is not a device capable of PD communication.

In step S303, the control unit 107 causes the PD communication unit 102 to transmit a message requesting the power supply device 120 to supply a first power regardless of whether the power supply device 120 is a predetermined device (i.e., a device conforming to the USB PD standard). For example, the control unit 107 selects one power among the powers that the power supply device 120 can supply, which is indicated by the information the PD communication unit 102 has received in a predetermined message from the power supply device 120 in step S301. Then, the control unit 107 causes the PD communication unit 102 to transmit a message requesting the power supply device 120 to supply the selected power (Request).

As an example, the control unit 107 can select the smallest power at which the power receiving device 100 can perform authentication of the power supply device 120 as the first power from among the powers that the power supply device 120 can supply. The authentication of the power supply device 120 is performed for the power receiving device 100 to determine whether the power supply device 120 is a predetermined device (i.e., a device conforming to the USB PD standard) and corresponds to the operation of steps S305 to S308 to be described later. For example, it is assumed that the power supply device 120 can supply 2.5 W (5V, 500 mA), 15 W (5V, 3 A), 27 W (9V, 3 A), and 30 W (15V, 2 A), and that 2.5 W (5V, 500 mA) is required to perform authentication. In this case, the control unit 107 selects 2.5 W (5V, 500 mA) as the first power.

In step S304, the control unit 107 sets the operation of the power receiving unit 104 upon receiving a message indicating that the request for power supply is accepted, from the power supply device 120 via the PD communication unit 102. For example, the control unit 107 sets the power receiving unit 104 to control the current to 500 mA or less, so that the power to be supplied does not exceed the first power. The power receiving unit 104 supplies the first power supplied from the power supply device 120 to a predetermined component such as a load 105. The control unit 107 may reduce the power consumption of the load 105 by restricting the functions or operations of the load 105 as necessary such as switching to the power saving mode.

In step S305, the control unit 107 instructs the authentication unit 103 to start authentication communication with the power supply device 120. Then, the authentication unit 103 performs authentication communication with the power supply device 120 via the PD communication unit 102. In the authentication communication, the power receiving device 100 operates as an authentication initiator, and the power supply device 120 operates as an authentication responder.

The authentication unit 103 determines whether or not the power supply device 120 is a predetermined device (i.e., a device conforming to the USB PD standard). For example, the authentication unit 103 can perform a determination based on whether or not predetermined authentication information specified in the USB AUTH standard is received from the power supply device 120 within a predetermined period of time via authentication communication. The authentication unit 103 determines that the power supply device 120 is a predetermined device if the predetermined authentication information is received within the predetermined period of time. The authentication unit 103 determines that the power supply device 120 is not a predetermined device if the predetermined authentication information is not received within the predetermined period of time. The authentication unit 103 notifies the control unit 107 of the determination result (authentication result).

The predetermined authentication information may be any information specified in the USB AUTH standard. Here, it is assumed that the information is unique information assigned to each product that is referred to as an XID. In addition, the authentication unit 103 includes a non-volatile memory that stores a list of XIDs of devices that have been authenticated as conforming to the USB PD standard. The authentication unit 103 can determine that the power supply device 120 is a predetermined device if a response message including an XID included in the list is received from the power supply device 120 within the predetermined period of time after transmitting a message requesting for authentication information (e.g., certificate chain). The predetermined period of time may be any period of time specified in the USB PD standard and may be, for example, 4.5 seconds.

The authentication unit 103 acquires device information from the power supply device 120 in authentication communication. For example, the authentication unit 103 transmits a Security_Request PD message to the power supply device 120 through the PD communication unit 102. A control unit 125 of the power supply device 120 generates a Security_Response PD message including information corresponding to the Security_Request PD message received through the PD communication unit 122. At this time, the control unit 125 reads device information from the storage unit 123 and includes the device information in the Security_Response PD message. This makes it possible for the authentication unit 103 to acquire device information from the power supply device 120 through authentication communication.

The device information may be included, for example, in Vendor Extension TLV Fields of ACD (Additional Certificate Data) included in the Security_Response PD message. TLV is an abbreviation of Type, Length, and Value.

Figure 4:
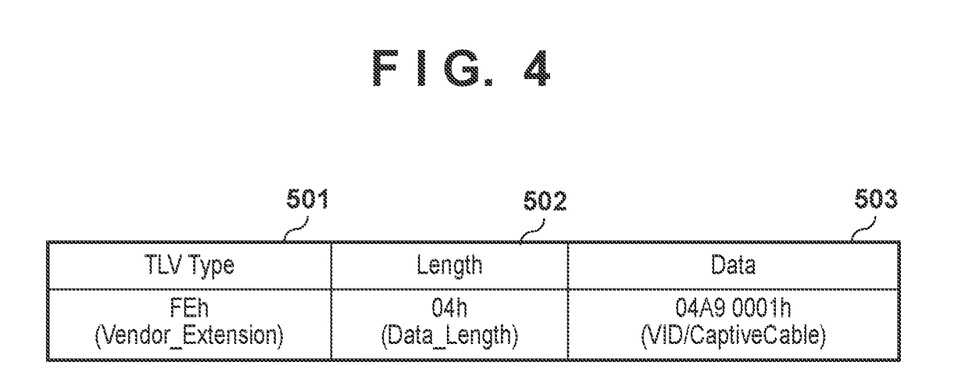
FIG. 4 is a diagram for illustrating an example of a data format of device information according to the first embodiment.

FIG. 4 illustrates a configuration of TLV Fields of a PD message. The TLV Fields comprise a Type field 501, a Length field 502, and a Data field 503.

The Type field 501 is a region for storing a hexadecimal number indicating the type of TLV information. The number FEh indicates that the information stored in the Data field 503 is Vendor Extension information.

The Length field 502 is a region for storing a hexadecimal number indicating the data size of the information stored in the Data field 503. The number 04h indicates that the data size is 4 Bytes.

The Data field 503 is a region for storing information as data in hexadecimal format. Of the 4 bytes, the upper 2 bytes (04A9h) are a Vendor ID assigned to each device vendor. The lower 2 bytes (0001h) indicate that the power supply device 120 is a no-additional-cable-required type of power supply device. If the lower 2 bytes is 0000h, it indicates that the power supply device 120 is not the no-additional-cable-required type of power supply device. Note that the value of the lower 2 bytes may be made to differ depending on the no additional-cable-required type of power supply device (i.e., whether it is a power supply device having an integrated USB cable or a power supply device having a connector capable of connecting with a power receiving device without using a USB cable).

The device information having the format of FIG. 4 is encrypted by the PD communication unit 122 by a process conforming to the USB AUTH standard and then included in the Security_Response PD message. For example, device information may be included as Leaf Certificate information in a Security_Response PD message responding to a Security_Request PD message requesting for a certificate chain.

In step S306, the control unit 107 determines whether or not the power supply device 120 has been successfully authenticated. The control unit 107 performs the process of step S307 if it is determined that the power supply device 120 has been successfully authenticated. The control unit 107 performs the process of step S312 if it is determined that the power supply device 120 has not been successfully authenticated. The control unit 107 determines that the power supply device 120 has been successfully authenticated if it is determined that the power supply device 120 is a predetermined device by the authentication unit 103.

In step S307, the control unit 107 instructs the authentication unit 103 to start authentication communication with the cable 130. Then, the authentication unit 103 performs authentication communication with the cable 130 via the PD communication unit 102. In the authentication communication, the power receiving device 100 operates as an authentication initiator, and the cable 130 operates as an authentication responder.

The authentication unit 103 determines whether or not the cable 130 is a predetermined device (i.e., a device conforming to the USB PD standard). For example, the authentication unit 103 can perform a determination based on whether or not predetermined authentication information specified in the USB AUTH standard is received from the cable 130 within a predetermined period of time by authentication communication. The authentication unit 103 notifies the control unit 107 of the determination result. Step S307 can be performed similarly to step S305, except that the partner of authentication communication differs.

In step S308, the control unit 107 determines whether or not the cable 130 has been successfully authenticated. The control unit 107 performs a process of step S310 if it is determined that the cable 130 has been successfully authenticated. The control unit 107 performs the process of step S309 if it is determined that the cable 130 has not been successfully authenticated. The control unit 107 determines that the cable 130 has been successfully authenticated if it is determined that the cable 130 is a predetermined device by the authentication unit 103.

In step S309, the authentication unit 103 determines whether or not the power supply device 120 is a no-additional-cable-required type of power supply device based on the device information obtained in step S305. In the case of the device information illustrated in FIG. 4, if the lower 2 bytes of the value stored in the Data field 503 are 0001h, the authentication unit 103 determines that the power supply device 120 is the no-additional-cable-required type of power supply device. If the lower 2 bytes of the value stored in the Data field 503 are 0000h, the authentication unit 103 determines that the power supply device 120 is not the no-additional-cable-required type of power supply device. The authentication unit 103 notifies the control unit 107 of the determination result.

The control unit 107 performs step S310 if it is determined that the power supply device 120 is the no-additional-cable-required type of power supply device. The control unit 107 performs the process of step S312 if it is determined that the power supply device 120 is not the no-additional-cable-required type of power supply device.

If the power supply device 120 is not the no-additional-cable-required type of power supply device, the cable 130 is a stand-alone cable (i.e., a cable separate from the power supply device 120). Accordingly, the cable 130 is considered inappropriate if it is determined that the cable 130 is not a predetermined device.

On the other hand if the power supply device 120 is the no-additional-cable-required type of power supply device, it is considered that the authentication result for the power supply device 120 indicates the authentication result for the configuration including the cable 130. Therefore, if it is determined that the power supply device 120 is a predetermined device, it can be considered that it is also determined that the cable 130 is a predetermined device.

In step S310, the control unit 107 causes the PD communication unit 102 to transmit a message requesting the power supply device 120 to supply a second power. The second power may be of greater power than the first power and is typically the power required when the function of the power receiving device 100 is not restricted. The control unit 107 selects the second power also from among the powers that the power supply device 120 can supply. The control unit 107 selects, for example, 30 W (15V, 2 A) as the second power.

In step S311, the control unit 107 sets the operation of the power receiving unit 104 upon receiving a message indicating that a request for power supply is accepted, from the power supply device 120 via the PD communication unit 102. For example, the control unit 107 sets the power receiving unit 104 to control the current to 2 A or less, so that the power to be supplied does not exceed the second power. The power receiving unit 104 supplies the second power supplied from the power supply device 120 to a component such as the load 105. Note that the function restriction in the period in which the first power was being supplied can be removed or reduced at this timing.

In step S312, the control unit 107 causes the PD communication unit 102 to stop PD communication. Thus, the supply of the first power from the power supply device 120 is stopped. Thus, the power supply device 120 and the power receiving device 100 return to the state they were in before the PD communication was started. When the process of step S312 is performed according to the determination result in step S306, the control unit 107 may continue the operation of the power receiving device 100 at the first power without stopping the communication conforming to the USB PD standard. Thus, it is possible to continue to provide a portion of the functions of the power receiving device 100 while ensuring a certain level of safety.

Figure 3:
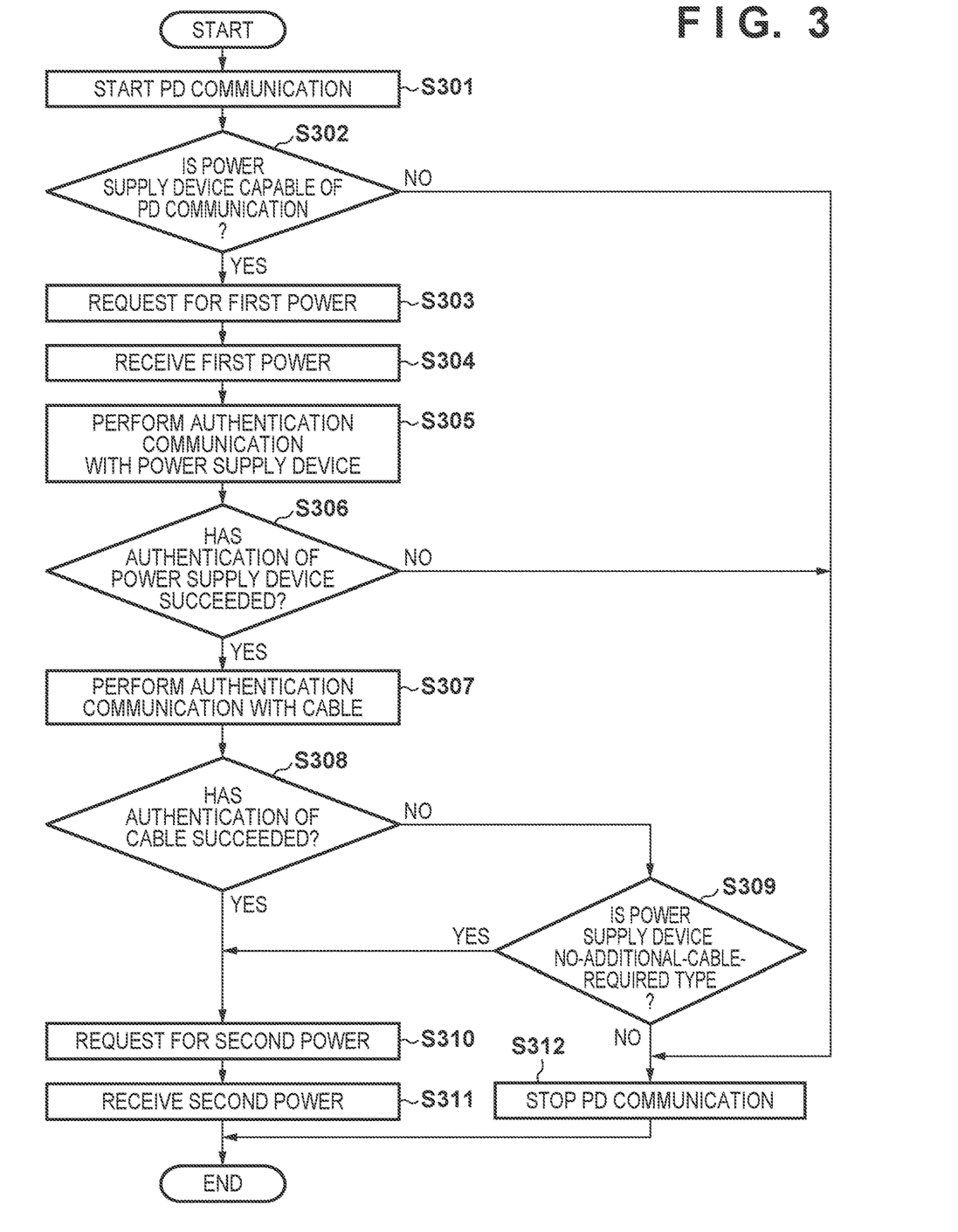
FIG. 3 is a flowchart relating to a process performed.

In the flowchart of FIG. 3, if the cable 130 has not been successfully authenticated (NO in step S308), it is determined whether or not the power supply device 120 is of no-additional-cable-required type (step S309). However, a determination of whether or not the power supply device 120 is of no-additional-cable-required type (step S309) can be performed if the power supply device 120 has been successfully authenticated (YES in step S306). In this case, the authentication communication with the cable 130 can be omitted if the power supply device 120 is determined to be of no-additional-cable-required type.

In this instance, the control unit 107 performs the process of step S309 prior to step S307. Then, if it is determined that the power supply device 120 is of no-additional-cable-required type, the control unit 107 performs step S310. If it is not determined that the power supply device 120 is of no-additional-cable-required type, the control unit 107 performs authentication communication with a cable in step S307. If the cable has not been successfully authenticated (NO in step S308), the control unit 107 performs the process of step S312.

As described above, the power receiving device 100 according to the first embodiment can appropriately control the power supply from the power supply device 120 to the power receiving device 100 if it is determined that the power supply device 120 is a no-additional-cable-required type of power supply device and the power supply device 120 is successfully authenticated. For example, if it is determined that the power supply device 120 is of no-additional-cable-required type, it is possible to consider that the cable 130 has been successfully authenticated or not to perform authentication communication with the cable 130.

[Second Embodiment] Next, a second embodiment will be described with reference to FIGS. 5 and 6. Since the configurations of the power supply device 120 and the power receiving device 100 according to the second embodiment are the same as in the first embodiment, their descriptions will be omitted.

The process performed by the power receiving device 100 according to the second embodiment will be described with reference to the flowchart of FIG. 5. In FIG. 5, reference numerals that are the same as in FIG. 3 are assigned to steps in which processes that are the same as in the first embodiment are performed, and their descriptions will be omitted.

After starting the reception of the supply of the first power in step S304, the control unit 107 instructs the authentication unit 103 to start authentication communication with the power supply device 120 in step S501. Then, the authentication unit 103 performs authentication communication with the power supply device 120 via the PD communication unit 102. The content of the authentication communication is the same as in the first embodiment, but the power supply device 120 does not include device information in a response message (Security_Response PD message) in the authentication communication. Therefore, at the point in time when the authentication communication is completed, the power receiving device 100 has not acquired the device information of the power supply device 120.

According to the second embodiment, when it is determined in step S308 that the cable 130 has not been successfully authenticated, the control unit 107 performs the process of step S502. Note that since the processes for when it is determined in step S308 that the cable 130 has been successfully authenticated are the same as in the first embodiment, their descriptions will be omitted.

In step S502, the control unit 107 performs PD communication with the power supply device 120 through the PD communication unit 102 and acquires device information from the power supply device 120. The control unit 107 can acquire device information from the power supply device 120 using, for example, a Vendor_Defined message (VDM) specified in the USB PD standard.

Figure 6:
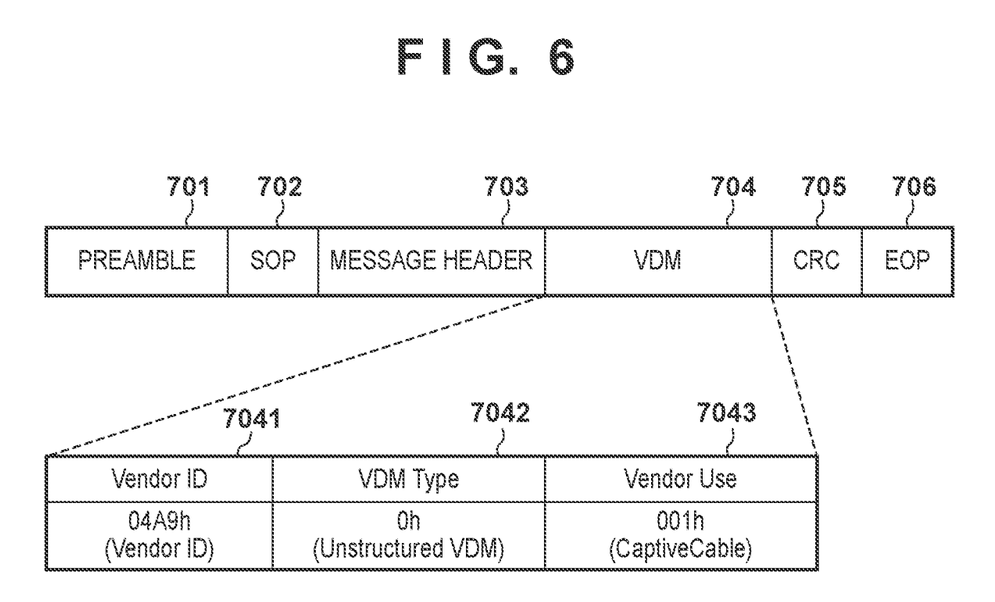
FIG. 6 is a diagram for illustrating an example of a data format of a message used for communication of device information according to the second embodiment.

FIG. 6 illustrates an example of a VDM format that can be used in step S502 and an example of a VDM message that transmits device information from the power supply device 120 to the power receiving device 100. A preamble 701 indicates a start of the message and is used to synchronize the communication. A fixed value is stored in the preamble 701. Data specifying a destination of the message is stored in an SOP (Start of Packet) 702. Here, a value indicating that the communication is addressed to the power receiving device 100 (Port Partner) is contained.

A message header 703 is a message header indicating information on communication such as the type of message, and although not illustrated, a value conforming to the USB PD standard to indicate that the message is a VDM is stored in the message header 703. Data to be transmitted in the message (here, device information) is stored in a VDM 704. The device information may be or may not be the same as in the first embodiment as long as it includes information that can identify whether or not the power supply device 120 is of no-additional-cable-required type. A cyclic redundancy code that is used to verify whether the message has been correctly sent is stored in a CRC 705. A value indicating an end of the message is stored in an EOP 706.

The VDM 704 includes a Vendor ID 7041, a VDM Type 7042, and a Vender Use 7043. A 16-bit value assigned to each device vendor is stored in the Vendor ID 7041. A 1-bit value indicating the type of VDM is stored in the VDM Type

7042. The value 0h indicates that the type of VDM is Unstructured VDM. The Vender Use 7043 is a 15-bit region, and device information is stored in this region. The value 001h is device information indicating that the power supply device 120 is of no-additional-cable-required type. If the power supply device 120 is not of no-additional-cable-required type, the value 000h is stored in the Vender Use 7043.

Here, although the device information is stored in the message in plaintext, the device information may be encrypted and stored in the message. The device information can be encrypted by any method that can be decrypted in the power receiving device 100. For example, the device information can be encrypted using key information used in the authentication communication in step S305.

In step S309, the authentication unit 103 of the power receiving device 100 determines whether or not the power supply device 120 is a no-additional-cable-required type of power supply device based on the device information acquired from the power supply device 120 in step S502. Since the subsequent processes are the same as in the first embodiment, their descriptions will be omitted.

Figure 5:
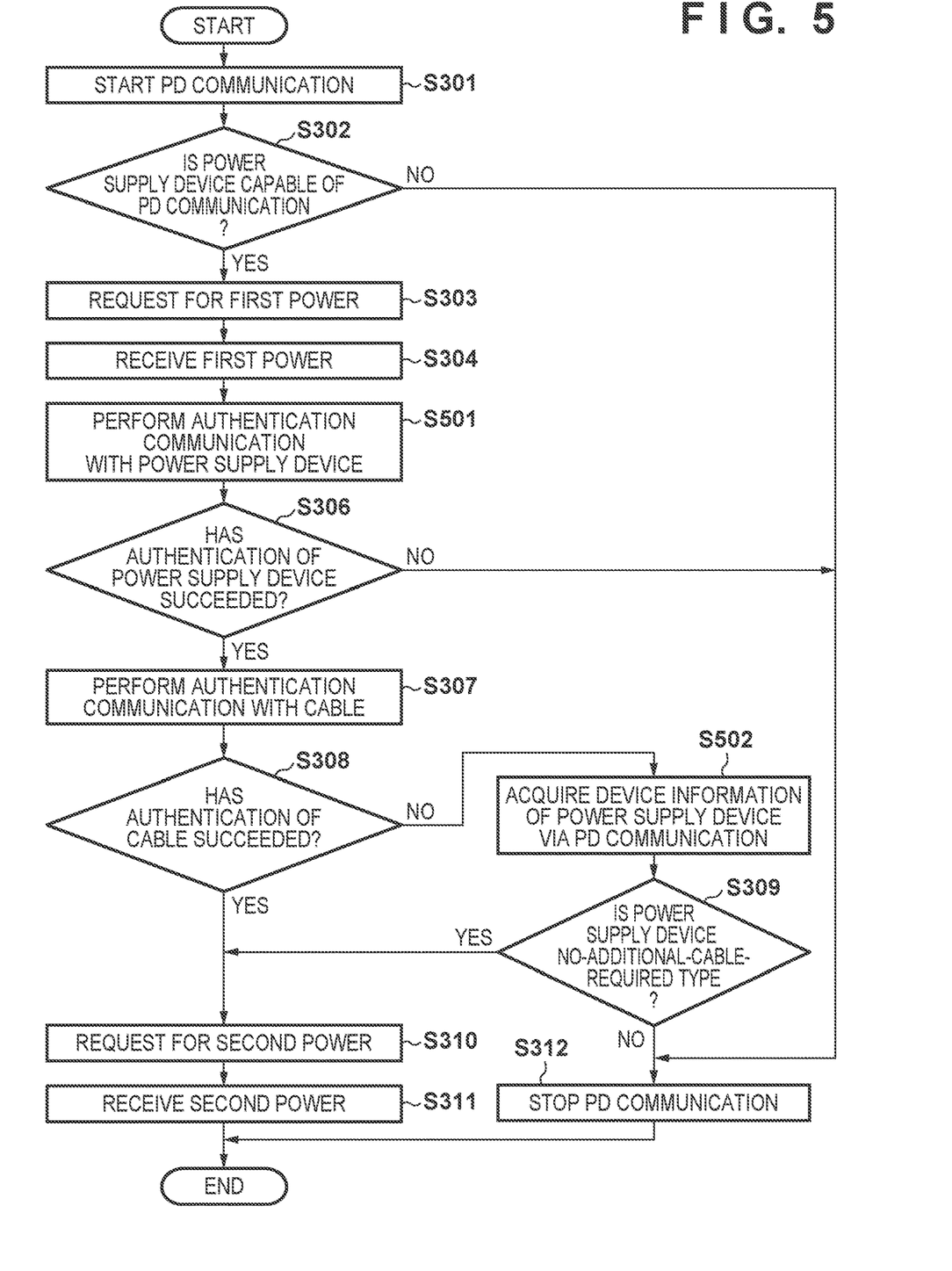
FIG. 5 is a flowchart relating to a process performed according to a second embodiment.

In the flowchart of FIG. 5, if the cable 130 has not been successfully authenticated (NO in step S308), an acquisition of the device information of the power supply device 120 and a determination of whether or not the power supply device 120 is of no-additional-cable-required type (i.e., steps S502 and S309) are performed. However, steps S502 and S309 can be performed if the power supply device has been successfully authenticated (YES in step S306) to determine whether or not the power supply device 120 is of no-additional-cable-required type. Then, the authentication communication with the cable 130 (step S307) can be omitted if the power supply device 120 is determined to be of no-additional-cable-required type.

In this instance, the control unit 107 performs the process of steps S502 and S309 prior to step S307. Then, if it is determined that the power supply device 120 is of no-additional-cable-required type, the control unit 107 performs step S310. If it is not determined that the power supply device 120 is of no-additional-cable-required type, the control unit 107 performs authentication communication with the cable 130 in step S307. If the cable 130 has not been successfully authenticated (NO in step S308), the control unit 107 performs the process of step S312.

As described above, the power receiving device 100 according to the second embodiment can acquire information indicating whether or not the power supply device 120 is a no-additional-cable-required type of power supply device by a communication different from the authentication communication relating to power supply. Thus, similarly to the first embodiment, the second embodiment can appropriately control the power supply from the power supply device 120 to the power receiving device 100 even if the power supply device 120 is the no-additional-cable-required type of power supply device.

[Third Embodiment] Next, a third embodiment will be described with reference to FIGS. 7 to 9.

Figure 7:
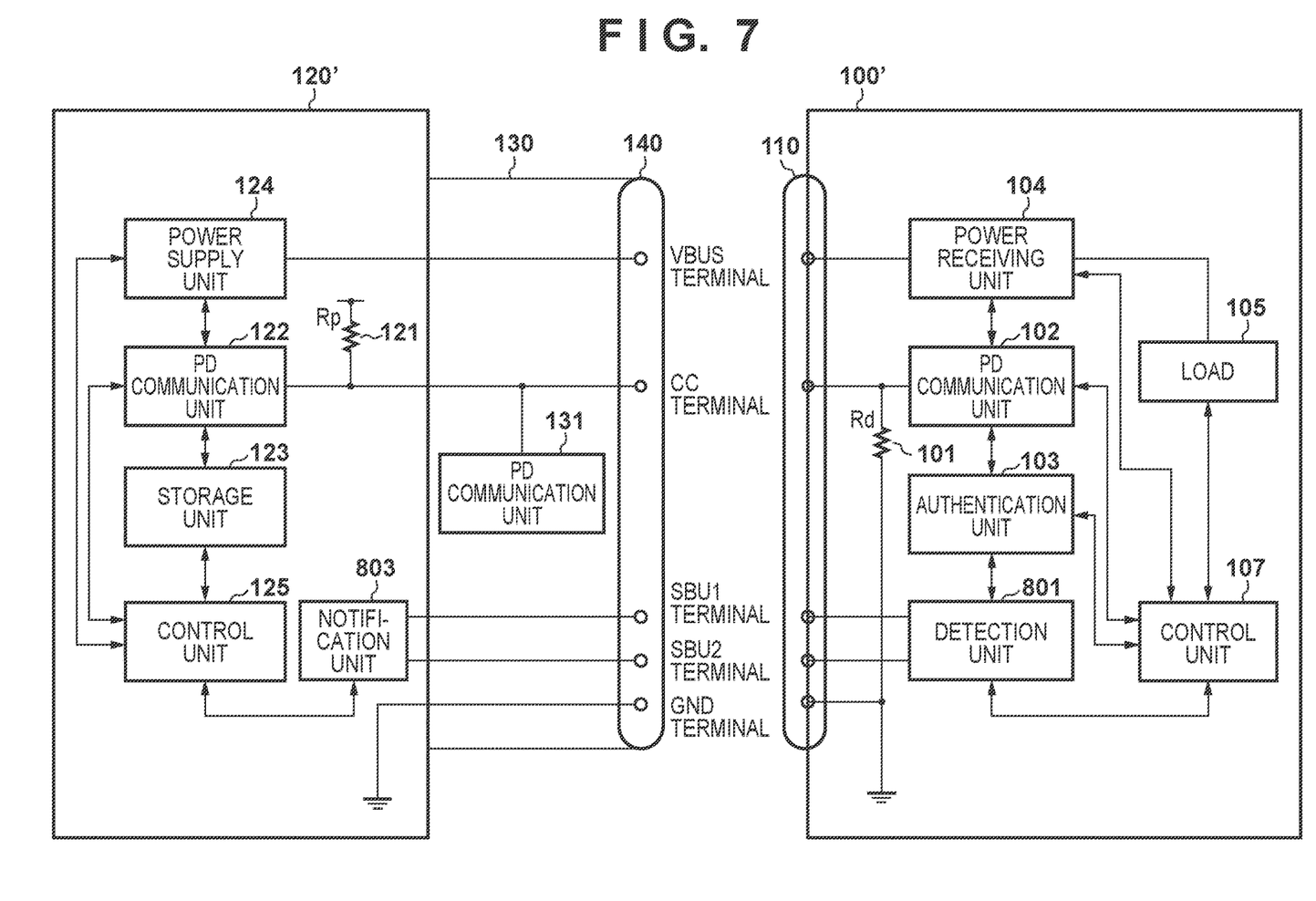
FIG. 7 is a block diagram for illustrating an example of a configuration of a power receiving device 100' and a power supply device 120' according to a third embodiment.

FIG. 7 is a block diagram for illustrating an example of a configuration of a power receiving device 100' and a power supply device 120' according to the third embodiment. Of the components of the power supply device 120' according to the third embodiment, reference numerals that are the same as in FIG. 2 are assigned to the components described in the first embodiment, and their descriptions will be omitted. Of the components of the power receiving device 100' according to the third embodiment, reference numerals that are the same as in FIG. 2 are assigned to the components described in the first embodiment, and their descriptions will be omitted.

A detection unit 801 included in the power receiving device 100' is connected to one or both of an SBU1 terminal and an SBU2 terminal of the receptacle 110. The detection unit 801 detects whether the power supply device 120 connected by the cable 130 is of no-additional-cable-required type. The detection unit 801 notifies the control unit 107 of the detection result.

A notification unit 803 included in the power supply device 120' is connected to one or both of an SBU1 terminal and an SBU2 terminal of the plug 140. The notification unit 803 notifies the power receiving device 100' whether the power supply device 120' is of no-additional-cable-required type. The notification unit 803 may be configured by a number of passive components or the like.

Since both the detection unit 801 and the notification unit 803 are connected to the SBU terminal(s), the notification unit 803 is electrically connected with the detection unit 801 when the plug 140 of the power supply device 120' is connected to the receptacle 110 of the power receiving device 100'.

FIGS. 8A to 8D are diagrams for illustrating examples of a configuration of the notification unit 803. The examples of the configuration illustrated in FIGS. 8A to 8D are merely examples, and the notification unit 803 may take any configuration in which the device information of a power supply device is notified from the power supply device 120' to the power receiving device 100' using at least one of the SBU1 terminal and the SBU2 terminal. Device information may be any information with which the power receiving device 100' can at least identify whether or not the power supply device 120' is of no-additional-cable-required type.

Figure 8A:
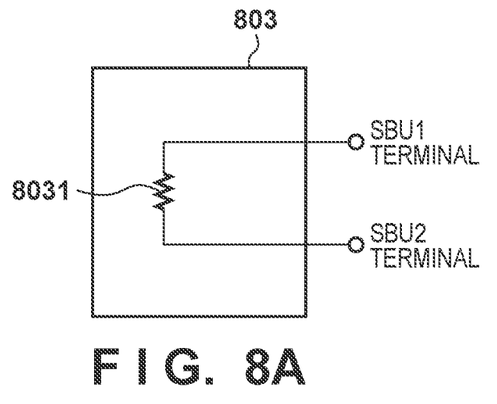
FIGS. 8A to 8D are block diagrams for illustrating examples of a configuration of a notification unit 803 according to the third embodiment.

The notification unit 803 illustrated in FIG. 8A has a resistor 8031 for connecting the SBU1 terminal and the SBU2 terminal. The value of the resistor 8031 is arbitrary. Furthermore, it is assume that the configuration is such that the detection unit 801 supplies a constant current to the SBU1 terminal (or the SBU2 terminal) and monitors the voltage of the SBU2 terminal (or the SBU1 terminal). In this case, when the plug 140 of the power supply device 120' is connected to the receptacle 110 of the power receiving device 100', the detection unit 801 detects that the SBU1 terminal and the SBU2 terminal are connected by a resistor in the notification unit 803.

Figure 8B:
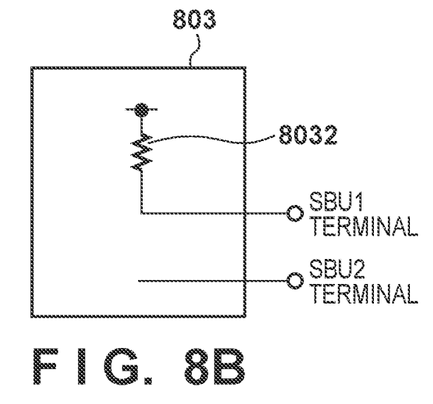

The notification unit 803 illustrated in FIG. 8B has a pull-up resistor 8032 connected to the SBU1 terminal. The value of the pull-up resistor 8032 and the potential of the power supply are both arbitrary. The SBU2 terminal (or the SBU1 terminal) is open. Furthermore, it is assumed that the configuration is such that the detection unit 801 monitors the potential of the SBU1 terminal. In this case, when the plug 140 of the power supply device 120' is connected to the receptacle 110 of the power receiving device 100', the detection unit 801 detects that the potential of the SBU1 terminal has reached a predetermined value or more. The pull-up resistor 8032 may be connected to the SBU2 terminal instead of the SBU1 terminal, or the pull-up resistor 8032 may be connected to each of the SBU1 terminal and the SBU2 terminal.

Figure 8C:
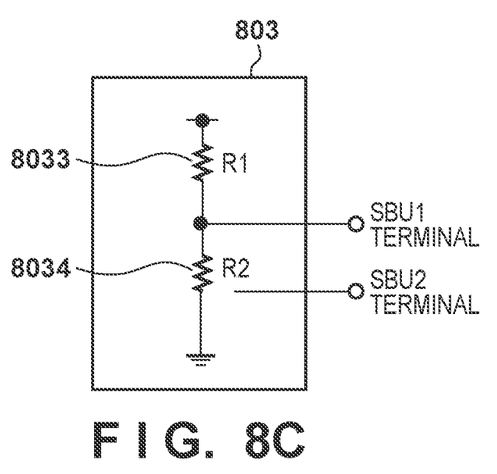

The notification unit 803 illustrated in FIG. 8C has resistors 8033 and 8034 connected in series between the power supply and the GND, and the SBU1 terminal is connected to the point of connection between the resistors 8033 and 8034. The potential of the power supply and the values of the resistors 8033 and 8034 are arbitrary. Assuming that the value of the resistor 8033 is R1 and the value of the resistor 8034 is R2, the SBU1 terminal has a voltage corresponding to the values of R1 and R2. Furthermore, it is assumed that the configuration is such that the detection unit 801 monitors the potential of the SBU1 terminal. In this case, when the plug 140 of the power supply device 120' is connected to the receptacle 110 of the power receiving device 100', the detection unit 801 detects that the potential of the SBU1 terminal has reached a predetermined value. Note that the SBU2 terminal instead of the SBU1 terminal may be connected to the resistors 8033 and 8034. In addition, each of the SBU2 terminal and the SBU1 terminal may be connected to the resistors 8033 and 8034.

Figure 8D:
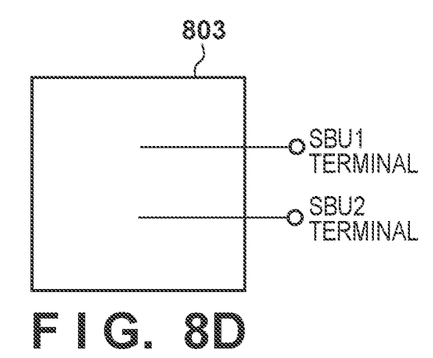

In the notification unit 803 illustrated in FIG. 8D, both the SBU1 terminal and the SBU2 terminal are in an open state. In this case, even if the plug 140 of the power supply device 120' is connected to the receptacle 110 of the power receiving device 100', the detection unit 801 cannot detect the change in potential of the SBU1 terminal and the SBU2 terminal.

According to the third embodiment, it is assumed that the power supply device 120' has the notification unit 803 having a configuration illustrated in any of FIGS. 8A to 8C when it is of no-additional-cable-required type. In addition, it is assumed that the power supply device 120' has the notification unit 803 having a configuration illustrated in FIG. 8D when it is not of no-additional-cable-required type. Furthermore, the detection unit 801 is configured to be able to detect whether or not the connected power supply device 120' is of no-additional-cable-required type based on the potential of at least one of the SBU1 terminal and the SBU2 terminal. Here, it is assumed that the notification unit 803 notifies the device information using the potential of the SBU1 terminal and/or the SBU2 terminal and that the detection unit 801 performs detection based on the potential of the SBU1 terminal and/or the SBU2 terminal. However, if the notification unit 803 is to notify the device information in another way, a method for the detection unit 801 to detect whether or not the power supply device 120' is of no-additional-cable-required type may differ accordingly.

Next, the process performed by the power receiving device 100' according to the third embodiment will be described with reference to the flowchart of FIG. 9. In FIG. 9, reference numerals that are the same as in FIG. 3 are assigned to steps in which the processes that are the same as in the first embodiment are performed, and reference numerals that are the same as in FIG. 5 are assigned to step in which of the processes that are the same as in the second embodiment are performed, and their descriptions will be omitted.

Figure 9:
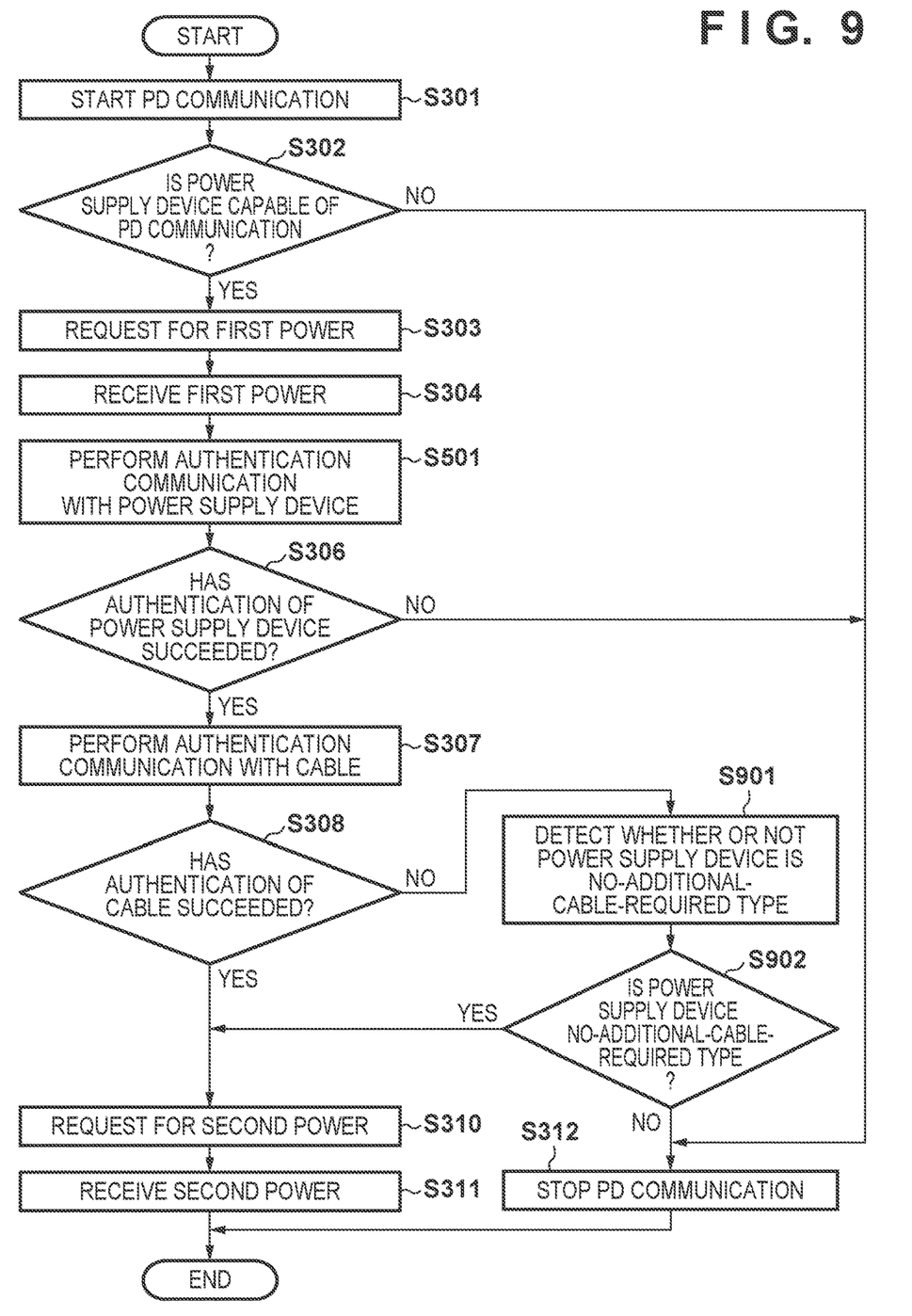
FIG. 9 is a flowchart relating to a process performed according to the third embodiment.

In FIG. 9, the processes up to steps S301 to S308 are the same as in the second embodiment. When it is determined in step S308 that the cable 130 has not been successfully authenticated, the control unit 107 performs the process of step S901. Note that since the processes for when it is determined in step S308 that the cable 130 has been successfully authenticated are the same as in the first embodiment, their descriptions will be omitted.

In step S901, the detection unit 801 detects whether or not the power supply device 120' is of no-additional-cable-required type from the notification unit 803 based on the potential of the SBU1 terminal and the SBU2 terminal. For example, the detection unit 801 detects that the power supply device 120' is of no-additional-cable-required type if it is detected that the notification unit 803 having a configuration illustrated in any of FIGS. 8A to 8C is connected. For example, the detection unit 801 detects that the power supply device 120' is not of no-additional-cable-required type if it is detected that the notification unit 803 having the configuration illustrated in FIG. 8D is connected.

Here, it is assumed that the detection unit 801 notifies the control unit 107 of the detection result when it is detected that the power supply device 120' is of no-additional-cable-required type and does not notify the control unit 107 of the detection result when it is detected that the power supply device 120' is not of no-additional-cable-required type.

In step S902, the control unit 107 determines whether or not the power supply device 120' is a no-additional-cable-required type of power supply device based on whether or not there is notification from the detection unit 801. Then, the control unit 107 performs step S310 if it is determined that the power supply device 120' is a no-additional-cable-required type of power supply device. In addition, the control unit 107 performs the process of step S312 if it is determined that the power supply device 120' is not the no-additional-cable-required type of power supply device.

In the flowchart of FIG. 9, if the cable 130 has not been successfully authenticated (NO in step S308), the detection unit 801 determines whether or not the power supply device 120' is of no-additional-cable-required type (step S901). However, configuration may be taken so as to perform step S901 if the power supply device 120' has been successfully authenticated (YES in step S306) and determine whether or not the power supply device 120' is of no-additional-cable-required type. Then, configuration may be taken so as not to perform the authentication communication with the cable 130 if the power supply device 120' is determined to be of no-additional-cable-required type.

In this case, the detection unit 801 performs the process of step S901 at any point in time from when the power supply device 120' is connected until before step S307. Then, the control unit 107 performs the process of step S902 between steps S306 and S307. If it is determined that the power supply device 120' is of no-additional-cable-required type, the control unit 107 performs step S310. In addition, if it is not determined that the power supply device 120' is of no-additional-cable-required type, the control unit 107 performs authentication communication with the cable 130 in step S307. If the cable 130 has not been successfully authenticated (NO in step S308), the control unit 107 performs the process of step S312.

As described above, the power receiving device 100' according to the third embodiment can acquire information indicating whether or not the power supply device 120' is a no-additional-cable-required type of power supply device using a terminal different from the terminal used in the authentication communication relating to power supply. Thus, similarly to the first embodiment, the third embodiment can appropriately control the power supply from the power supply device 120' to the power receiving device 100' even if the power supply device 120' is the no-additional-cable-required type of power supply device.

[Fourth Embodiment] The various functions, processes, or methods described in the above embodiments may also be implemented by a personal computer, a microcomputer, a CPU (Central Processing Unit), or a microprocessor executing a program. Hereinafter, in the fourth embodiment, a personal computer, a microcomputer, a CPU (Central Processing Unit), or a microprocessor are referred to as a "computer X." In the fourth embodiment, a program for controlling the computer X and realizing the various functions, processes, or methods described in the above embodiments is referred to as a "program Y".

The various functions, processes, or methods described in the above embodiments are realized by the computer X executing the program Y. In this case, the program Y can be supplied to the computer X via a computer-readable storage medium. The computer-readable storage medium in the fourth embodiment includes at least one of a hard disk device, a magnetic storage device, an optical storage device, a magneto-optical storage device, a memory card, a volatile memory, a nonvolatile memory, or the like. The computer-readable storage medium of the fourth embodiment is a non-transitory storage medium.

While various embodiments of the disclosure are described with reference to example embodiments, it is to be understood that the aspects of the disclosure are not limited to the example embodiments. The scope of the following claims is to be accorded the broadest interpretation so as to encompass all such modifications and equivalent structures.

This application claims the benefit of Japanese Patent Application No. 2020-184643, filed Nov. 4, 2020, which is hereby incorporated by reference herein in its entirety.

What is claimed is:

1. An electronic device comprising: a hardware processor that causes the electronic device to function as: a control unit that performs a control so that a first authentication communication with a power supply device for determining whether or not the power supply device is a predetermined device is performed and a second authentication communication with a cable for determining whether or not the cable is a predetermined device is performed, wherein the cable connects the power supply device to the electronic device, wherein the control unit performs a control to request a second power that is greater than a first power from the power supply device, in a case where the first authentication communication and the second authentication communication are succeeded, wherein the control unit also performs the control to request the second power from the power supply device in a case where the first authentication communication is succeeded and the power supply device is determined to be a no-additional-cable-required type of power supply device, even if the second authentication communication is not succeeded, wherein the no-additional-cable-required type of power supply device is: a first power supply device having an integrated cable; or a second power supply device having a connector capable of connecting with a power receiving device without using a cable.

2. The electronic device according to claim 1, wherein the determination of whether or not the power supply device is the no-additional-cable-required type of power supply device is performed based on information obtained in the first authentication communication with the power supply device.

3. The electronic device according to claim 1, wherein the determination of whether or not the power supply device is the no-additional-cable-required type of power supply device is performed based on information obtained in a communication that is different from the first authentication communication.

4. The electronic device according to claim 1, wherein the determination of whether or not the power supply device is the no-additional-cable-required type of power supply device is performed based on information obtained through another terminal than a terminal used in the first authentication communication with the power supply device.

5. The electronic device according to claim 4, wherein the information obtained through the other terminal is a voltage of the other terminal.

6. The electronic device according to claim 1, wherein the electronic device is a power receiving device.

7. The electronic device according to claim 1, wherein the first authentication communication and the second authentication communication conform to a USB Type-C Authentication standard and the predetermined device is a device that conforms to a USB Power Delivery standard.

8. A method comprising: performing a first authentication communication with a power supply device for determining whether or not the power supply device is a predetermined device; performing a second authentication communication with a cable for determining whether or not the cable is a predetermined device, wherein the cable connects the power supply device to the electronic device; requesting a second power that is greater than a first power from the power supply device, in a case where the first authentication communication and the second authentication communication are succeeded; and requesting the second power from the power supply device in a case where the first authentication communication is succeeded and the power supply device is determined to be a no-additional-cable-required type of power supply device, even if the second authentication communication is not succeeded, wherein the no-additional-cable-required type of power supply device is: a first power supply device having an integrated cable; or a second power supply device having a connector capable of connecting with a power receiving device without using a cable.

9. The electronic device according to claim 1, wherein the control unit performs a control so as not to request the second power from the power supply device in a case where the first authentication communication is succeeded, the second authentication is not succeeded, and the power supply device is not determined to be a no-additional-cable-required type of power supply device.

10. An electronic device comprising: a hardware processor that causes the electronic device to function as: a control unit that performs a control so that a first authentication communication with a power supply device for determining whether or not the power supply device is a predetermined device is performed and a second authentication communication with a cable for determining whether or not the cable is a predetermined device is performed, wherein the cable connects the power supply device to the electronic device, wherein the control unit performs a control to request a second power that is greater than a first power from the power supply device, in a case where the first authentication communication is succeeded and the second authentication communication is succeeded, wherein the control unit performs a control to request the second power from the power supply device without performing the second authentication communication in a case where the first authentication communication is succeeded and the power supply device is determined to be a no-additional-cable-required type of power supply device, wherein the no-additional-cable-required type of power supply device is: a first power supply device having an integrated cable; or a second power supply device having a connector capable of connecting with a power receiving device without using a cable.

11. The electronic device according to claim 10, wherein the first authentication communication and the second authentication communication conform to a USB Type-C Authentication standard and the predetermined device is a device conforms to a USB Power Delivery standard.

* * * * *